May 6, 1952     D. LANGFELD ET AL     2,595,470
RADIATOR TESTING APPARATUS
Filed June 13, 1946     2 SHEETS—SHEET 1

*INVENTOR.*
DANIEL LANGFELD
ROBERT LECKEY
RAYMOND A. OLSON
EARL GRANT WEBB
BY Bair & Freeman
ATTORNEYS May 6, 1952 D. LANGFELD ET AL 2,595,470
RADIATOR TESTING APPARATUS
Filed June 13, 1946 2 SHEETS—SHEET 2

INVENTOR.
DANIEL LANGFELD
ROBERT LECKEY
RAYMOND A. OLSON
EARL GRANT WEBB
BY Bair & Freeman
ATTORNEYS

Patented May 6, 1952

2,595,470

UNITED STATES PATENT OFFICE 2,595,470

RADIATOR TESTING APPARATUS

Daniel Langfeld, Robert Leckey, and Raymond A. Olson, Omaha, and Earl Grant Webb, Bellevue, Nebr., assignors, by mesne assignments, to Inland Manufacturing Company, Omaha, Nebr., a corporation of Nebraska Application June 13, 1946, Serial No. 676,496

6 Claims. (Cl. 73—118)

This invention relates to radiator testing apparatus and particularly to a testing apparatus for indicating the presence of foreign matter or restrictions in the core of a heat exchanger such as a radiator associated with the cooling system of an internal combustion engine.

Heretofore, very crude apparatus and methods of testing radiators for restrictions or foreign matter clogged therein have been utilized. For example, one method of testing being used by large radiator test and repair stations at the present time is as follows:

A large tank is filled with water and the water is fed by gravity to the top connection of a radiator for an internal combustion engine. A throttle valve is utilized to regulate the flow of water so that it runs through the radiator without overflowing through the overflow or fill openings of the radiator. A gauge on the tank shows the amount of water therein and a time clock is provided to take a time reading. The water entering the radiator flows out of the bottom connection of the radiator and spills out on the floor. Even if a drain is provided nearby, the water usually spreads over the floor and, in addition to being messy, is dangerous and slippery for the workmen. Furthermore, the water is wasted and when it is considered that 50 to 100 gallons of water may be used for one test, the expense of the water used, particularly in some localities, is considerable.

The test is performed by the operator noting the water level on the gauge and the time when the throttle valve is set so there is no overflow. After a predetermined time interval, which entails the operator watching the timing apparatus, the operator must take the reading of the liquid level gauge. From these readings, the gallons of water which have passed through the radiator in a given time is ascertained, and if too little water has passed through, the operator knows that the radiator core is obstructed in some manner and appropriate steps are taken.

However, the human error in such a test, which is exaggerated because the operator must shift his eyes from the gauge to the time clock and back again, is an obvious possibility and may reach 5 per cent to 10 per cent error. When it is realized that a 5 per cent error may result in a clogged radiator not being cleaned out or a good radiator being unnecessarily cleaned, the faults of such a test are readily apparent from the standpoint of inaccurate results. If a radiator is clogged, it is well known that the restriction may rapidly increase and it is extremely harmful to place a partially restricted radiator back in service.

Another type of testing apparatus is shown in the patent to Hussar 2,018,403, issued October 22, 1935. In the Hussar machine, however, a valve is first set at a position to permit the amount of water that should flow through the radiator, when clean and unobstructed, to be pumped to the radiator. If restrictions are present, a pressure gauge in the line shows a higher pressure than should prevail. The Hussar system, therefore, requires that the pump delivery be correlated with the orifices and the indicia on the valve, and that head and friction be constant, and if one or the other varies, for example, if the pump becomes worn or leaks, the test results are inaccurate. Furthermore, all radiator test data is based on free gravity flow, not on pressure flow. The present invention provides an accurate test regardless of the condition of the pump or valve, so long as the pump is of sufficient capacity. Furthermore, it is much less complicated than Hussar and does not require a special or calibrated valve.

It is, therefore, an object of the invention to provide a radiator testing apparatus which provides extremely accurate results in determining whether or not a radiator is clogged or restricted.

It is another object of the invention to prevent the waste of water in radiator testing.

It is another object of the invention to provide a radiator testing apparatus wherein the water used for testing is in a closed circuit and the water is not led to a drain or spilled over the floor.

It is also an object of the invention to provide radiator testing apparatus which is inexpensive and compact, so that it requires but little floor space in a shop or garage.

It is a further object of the invention to provide a radiator testing apparatus in which the circulated water is maintained in a relatively clean condition and in which the apparatus itself is readily cleaned.

It is still another object of the invention to provide an improved system for adjusting the flow of water through the radiator and a single indicating device which gives the operator the complete data required.

With these and other objects in view, our invention consists in the construction, arrangement and combination of the various parts of our device whereby the objects contemplated are attained, as hereinafter more fully set forth, pointed out in our claims and illustrated in the accompanying drawing, wherein:

Figure 2:
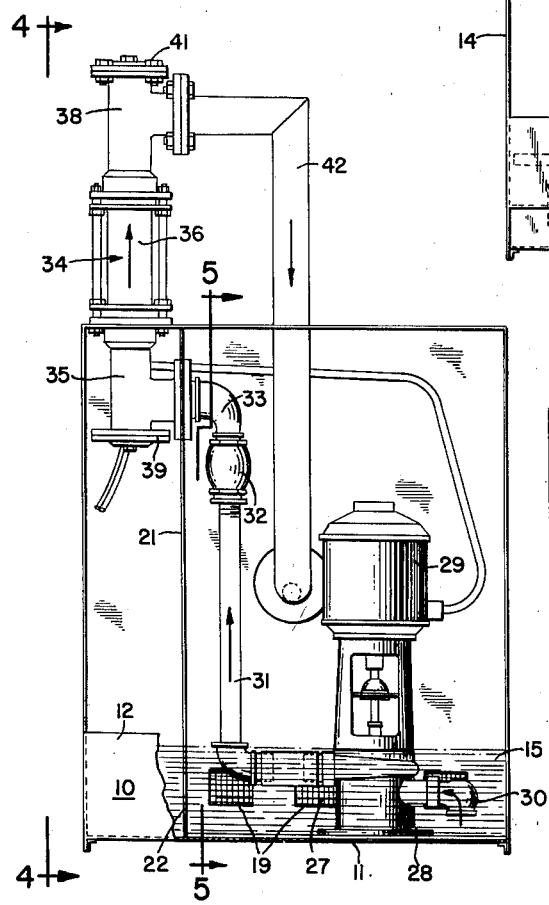
Figure 2 is a rear elevational view of the test apparatus also having parts broken away to better illustrate the invention.
Figure 3:
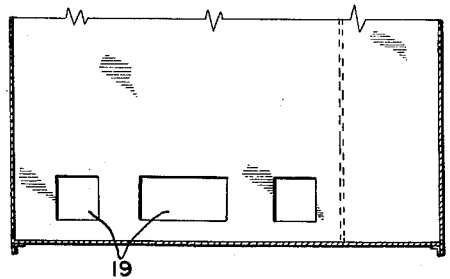
Figure 3 is a partial view of the partition between the front and rear portions of the apparatus taken on line 3—3 of Figure 5.
Figure 4:
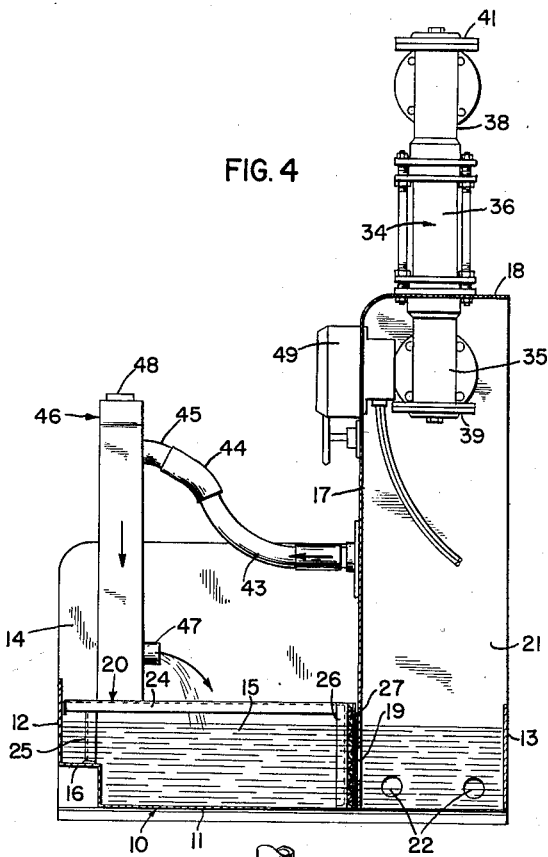
Figure 4 is a view taken on line 4—4 of Figure 2, with the end plates of the testing apparatus removed for the sake of clarity.
Figure 5:
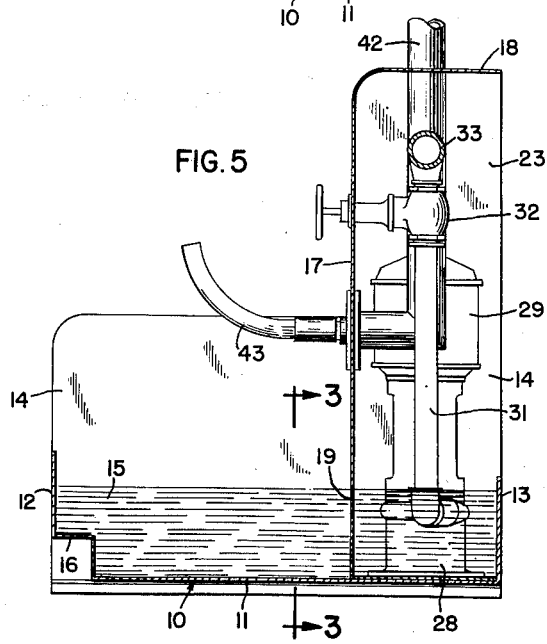
Figure 5 is a vertical sectional view taken on line 5—5 of Figure 2.
Figure 6:
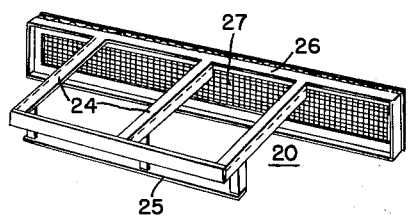
Figure 6 is a detail perspective view of the platform and screen used in the improved testing apparatus.

Referring specifically to the drawing for a detailed description of the invention, a cabinet for housing the testing apparatus comprises generally a U-shaped open ended sheet metal member 10 having a base 11 and upwardly extending front and rear walls 12 and 13, respectively. Lower side walls 14 are preferably welded to the base 11 and the front and rear walls 12 and 13, and extend considerably above said front and rear walls. The U-shaped member 10 and the side walls 14 form a tank or reservoir 15 for water, as shown in Figures 2, 4 and 5. As shown in Figs. 4 and 5, the U-shaped member 10 is bent to provide a horizontal shoulder 16 adjacent the front thereof, which provides for toe clearance in placing the device to be tested in or removing it from the apparatus.

A vertical partition 17 is provided intermediate the front and rear walls 12 and 13 and extends a considerable distance thereabove. The partition 17 is extended to provide a horizontal top wall 18 and is provided with a number of apertures 19 below the normal level of the water in the reservoir 15. A second vertical partition 21 extends between the partition 17 and the rear wall 13 and is also provided with a series of apertures 22 therein below the water level in reservoir 15. Upper side walls 23 are secured to the partition 17 and to the lower side walls 14, thus completing the cabinet structure.

A radiator supporting platform 20 is disposed in the reservoir 15 in front of partition 17 and consists of a plurality of horizontal bars 24 welded to a short front vertical rectangular frame 25 and to a larger rear rectangular frame 26. A screen 27 is fastened to the rear of frame 26 and completely covers the same. The screen 27 is substantially coextensive with the lower portion of partition 17 and covers the apertures 19 therein when platform 20 is in position with the short frame 25 resting on shoulder 16 of the U-shaped member 10 and the larger frame 26 resting on the bottom of the base 11.

A pump generally indicated at 28 is disposed in back of partition 17 with its inlet 30 in the reservoir 15. The pump is driven by a suitable motor 29. The pump 28 delivers water or other fluid from the reservoir 15 through a conduit 31 to a flow restricting valve 32, which is not shown in detail, since it is a standard piece of apparatus. A conduit 33 connects the valve 32 with a standard flow-meter designated generally at 34. Many types of flow-meters are available and the one shown is merely by way of example. The conduits 31 and 33 and the valve 32 are supported by the partition 21, and the handle of the valve 32 extends through partition 17.

Figure 1:
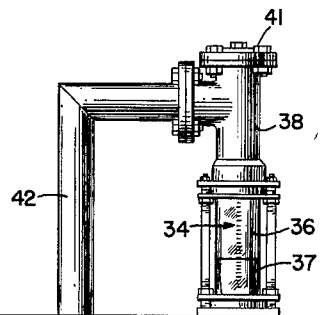
Figure 1 is a front elevational view of the test apparatus embodying the invention, with parts thereof broken away for the sake of clarity.

The flow-meter 34 comprises a lower T-shaped fitting 35, a transparent tapered body 36 marked with suitable indicia and a metallic float 37 which rises and falls in the body 36, depending on the flow of liquid therethrough, as shown in Figure 1. An upper T-shaped fitting 38 is secured to the top of the flow-meter body 36. Caps 39 and 41 are bolted to the fittings 35 and 38, respectively, and may be removed for cleaning the inside of the transparent body 36 with a swab, or may have inlet or outlet conduits bolted thereto.

The conduit 33 connects with one branch of the T-shaped fitting 35 and another branch is connected to the body 36. One branch of the T-shaped fitting 38 is connected to the top of the body 36 and another branch is connected to a conduit 42 which extends downwardly through the top 18 of the cabinet, then through partition 17, and terminates in an upturned goose-neck 43. As best shown in Figure 4, a flexible conduit 44 connects the goose-neck 43 with the top water connection 45 of a radiator 46 to be tested. The fluid flows through the radiator 46 by gravity and falls into the front portion of the reservoir 15 from outlet connection 47 of the radiator 46, whereupon it is recirculated, if desired.

*Operation*

In testing the radiator 46, or other similar heat exchange apparatus, the reservoir 15 is filled with water and the flexible hose 44 is connected between the goose-neck 43 and the top connection 45 of the radiator to be tested, which is disposed in an upright position on the platform 20. Preferably the fill opening 48 of the radiator is left open, and, of course, the overflow pipe (not shown) is also open. The bottom connection 47 is likewise open and is disposed above the liquid level in the reservoir 15.

The pump 28 and motor 29 are started by operating an electric switch 49 on the front of partition 17. Water or other liquid is then picked up from reservoir 15 through pump inlet 30 and is delivered by the pump 28 to conduit 31, valve 32, and conduit 33 to flow-meter 34, conduit 42, goose-neck 43 and flexible connector 44 to the top connection 45 of the radiator 46. The liquid flows by gravity through the radiator, as in normal operation on the automobile, and is returned to the reservoir through the radiator outlet 47.

When the pump 28 is started, the throttle valve 32 is open to a relatively non-throttling position, and more liquid is delivered to the radiator 46 than will flow therethrough by gravity. Liquid, therefore, overflows from the overflow pipe and perhaps from the fill opening 48. Valve 32 is then throttled or closed until just sufficient liquid is being delivered to the radiator to keep it full but not overflowing. The flow-meter 34 is then read to determine how many gallons of liquid per minute are passing through the radiator 46.

All the automobile manufacturers supply data with respect to the number of gallons of water per minute that should pass through a given radiator when clean and unrestricted. If insufficient water is passing through the radiator, the operator may determine this fact immediately by glancing at only one indicator which gives the complete information desired, that is, the flow-meter 34 or its equivalent. If sufficient liquid is being circulated, obviously, it is unnecessary to clean the radiator. It is, furthermore, to be noted that the liquid circulated is returned to the front part of the resevoir 15 and must pass through screen 27 before it again reaches the inlet 30 of the pump 28. Any sediment or rust is, therefore, caught and is not recirculated. The entire platform 20 is also readily removable for cleaning the reservoir 15 and the screen 27.

The liquid circulated is not wasted and does not run over the floor, since it is returned to the reservoir and is recirculated. Cleaning agents or solvents may be placed in the liquid circulated if desired.

From the foregoing, it will be apparent that we have provided an improved apparatus for testing radiators for internal combustion engine cooling systems, or similar heat exchange apparatus, which is accurate, not messy, and is inexpensive to manufacture and operate. Furthermore, the flow-meter system affords an indefinite number of flow rate indications up to the capacity of the flow-meter and may be easily read and understood by both the mechanic and the customer, without requiring technical knowledge on the part of either. From one simple reading, it is possible to determine whether or not the radiator is clogged or whether some other portion of the cooling system is responsible for overheating. The test requires very little time and the apparatus is portable so that it may be easily moved from place to place. Since most automobiles use gravity flow in the radiator, the test performed is similar to actual working conditions.

Some changes may be made in the construction and arrangement of the parts of our radiator testing apparatus without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. Apparatus for testing heat exchangers of the type comprising a plurality of passages for the flow of a liquid and having inlet and outlet connections thereto, said apparatus comprising a liquid reservoir, a pump for pumping liquid from the reservoir to the inlet connection, a conduit for conveying liquid from the pump to said inlet connection, means for controlling the rate of delivery of said liquid to the inlet connection to maintain a predetermined level of liquid in said heat exchanger, said liquid returning from said outlet connection to said reservoir, and a flow measuring means for continuously measuring the flow of liquid through said heat exchanger per unit of time during operation of said pump.

2. Apparatus for testing heat exchangers of the type comprising a plurality of passages therein for the flow of a liquid and having upper and lower conduit connections thereto, said apparatus comprising a liquid reservoir, a pump for pumping liquid from the reservoir to the upper conduit connection, a conduit for conveying liquid from the pump to said upper conduit connection, a flow restricting valve for controlling the rate of delivery of said liquid to the upper conduit connection to maintain a predetermined level of liquid in said heat exchanger, said liquid returning from said lower conduit connection to said reservoir, and a flow measuring means for continuously measuring the flow of liquid through said heat exchanger per unit of time during operation of said pump.

3. Apparatus for testing heat exchangers of the type comprising a plurality of passages for the flow of a liquid and having inlet and outlet connections thereto, said apparatus comprising a liquid reservoir, a pump for pumping liquid from the reservoir to the inlet connection, a conduit for conveying liquid from the pump to said inlet connection, a flow restricting valve for controlling the rate of delivery of said liquid to the inlet connection to maintain a predetermined level of liquid in said heat exchanger, said liquid returning from said outlet connection to said reservoir, and a flow-meter for continuously measuring the flow of liquid through said heat exchanger per unit of time during operation of said pump, said flow restricting valve and said flow-meter being disposed in said conduit for conveying liquid from the pump to said inlet connection.

4. Apparatus for testing heat exchangers of the type comprising a plurality of passages for the flow of a liquid and having inlet and outlet connections thereto, said apparatus comprising a liquid reservoir, a pump for pumping liquid from the reservoir to the inlet connection, a conduit for conveying liquid from the pump to said inlet connection, means for controlling the rate of delivery of said liquid to the inlet connection to maintain a predetermined level of liquid in said heat exchanger, said liquid returning from said outlet connection to said reservoir, a flow measuring means for continuously measuring the flow of liquid through said heat exchanger per unit of time during operation of said pump, and means for removing foreign matter from the liquid returning from said radiator before it re-enters said pump, said last means comprising a screen disposed in said reservoir between the portion thereof to which said liquid is returned from said outlet connection and the inlet of said pump.

5. Apparatus for testing heat exchangers of the type comprising a plurality of passages for the flow of a liquid and having inlet and outlet connections thereto, said apparatus comprising a liquid reservoir, a partition extending into said reservoir for dividing the reservoir into two parts, said partition having apertures therein affording communication between the two parts of said reservoir, a pump for pumping liquid from the reservoir to the inlet connection, said pump having an inlet disposed in one portion of said reservoir, a conduit for conveying liquid from the pump to said inlet connection, means for controlling the rate of delivery of said liquid to the inlet connection to maintain a predetermined level of liquid in said heat exchanger, said liquid returning from said outlet connection to the other portion of the reservoir, and a flow measuring means for measuring the flow of liquid through said heat exchanger during operation of said pump.

6. Apparatus for testing heat exchangers of the type comprising a plurality of passages for the flow of a liquid and having inlet and outlet connections thereto, said apparatus comprising a liquid reservoir, a partition extending into said reservoir for dividing the reservoir into two parts, said partition having apertures therein affording communication between the two parts of said reservoir, a pump for pumping liquid from the reservoir to the inlet connection, said pump having an inlet disposed in one portion of said reservoir, a conduit for conveying liquid from the pump to said inlet connection, means for controlling the rate of delivery of said liquid to the inlet connection to maintain a predetermined level of liquid in said heat exchanger, said liquid returning from said outlet connection to the other portion of the reservoir, a flow measuring means for measuring the flow of liquid through said heat exchanger during operation of said pump, and means for straining the liquid passing through the apertures in said partition.

DANIEL LANGFELD.
ROBERT LECKEY.
RAYMOND A. OLSON.
EARL GRANT WEBB.

REFERENCES CITED

The following references are of record in the file of this patent:

UNITED STATES PATENTS

| Number | Name | Date |
|---|---|---|
| 1,540,533 | Bullock | June 2, 1925 |
| 1,980,761 | Mock et al. | Nov. 13, 1934 |
| 2,018,403 | Hussar | Oct. 22, 1935 |
| 2,018,538 | Webb | Oct. 22, 1935 |

FOREIGN PATENTS

| Number | Country | Date |
|---|---|---|
| 570,091 | Great Britain | June 21, 1945 |